(12) United States Patent
Nishikino et al.

(10) Patent No.: US 6,754,463 B2
(45) Date of Patent: Jun. 22, 2004

(54) IMAGE READING APPARATUS AND METHOD OF ACCELERATING DRIVE OF READING PORTION THEREOF

(75) Inventors: Sachiko Nishikino, Tochigi (JP); Takuji Takahashi, Kanagawa (JP); Yoshiaki Nagao, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/299,718

(22) Filed: Nov. 20, 2002

(65) Prior Publication Data

US 2003/0095813 A1 May 22, 2003

(30) Foreign Application Priority Data

Nov. 22, 2001 (JP) ......................................... 2001-358335

(51) Int. Cl.[7] .............................................. G03G 15/04
(52) U.S. Cl. ....................................... 399/208; 318/696
(58) Field of Search ................................. 399/177, 206, 399/208, 209, 210; 318/685, 696; 358/409, 412, 413, 414

(56) References Cited

U.S. PATENT DOCUMENTS

| | | | |
|---|---|---|---|
| 4,568,171 A | * | 2/1986 | Ikenoue ...................... 399/208 |
| 5,089,902 A | | 2/1992 | Tsubota |
| 5,648,800 A | | 7/1997 | Takeda |
| 5,744,929 A | | 4/1998 | Miyazaki |
| 5,805,208 A | | 9/1998 | Meierdiercks |
| 5,991,570 A | | 11/1999 | Haga et al. |
| 6,031,633 A | | 2/2000 | Andoh et al. |
| 6,414,461 B1 | * | 7/2002 | Chang ........................ 318/696 |

FOREIGN PATENT DOCUMENTS

| | | |
|---|---|---|
| JP | 5-63905 | 3/1993 |
| JP | 8-186690 | 7/1996 |
| JP | 10-23215 | 1/1998 |
| JP | 2000-108443 | 4/2000 |
| JP | 2000-224382 | 8/2000 |

* cited by examiner

*Primary Examiner*—Hoan Tran
(74) *Attorney, Agent, or Firm*—Oblon, Spivak, McClelland, Maier & Neustadt, P.C.

(57) ABSTRACT

This invention provides an image reading apparatus having high speed, small size and low cost, capable of reducing CPU load and capacity required for a memorizing table. The image forming apparatus including a reading portion for reading an image by scanning an original document, driving means for driving the reading portion, and memory means for storing therein a plurality of driving frequencies for enabling the driving means to switch to a variety of speeds and drive in a step by step manner, and for storing therein a table indicative of a switching point for switching one driving frequency of the plurality of driving frequencies to another driving frequency of the plurality of driving frequencies, wherein one driving frequency of the plurality of driving frequencies is switched to another driving frequency of the plurality of driving frequencies at the switching point.

14 Claims, 6 Drawing Sheets

(a) HIGH ACCELERATION TABLE (b) LOW ACCELERATION TABLE

COMBINATION OF TABLES

FIG.6

EXAMPLE INDICATING READING SPEEDS AND SWITCHING POINTS

| SPEED RANGE | SWITCHING POINT | SPEED | TIME |
|---|---|---|---|
| MORE THAN 0 AND NO MORE THAN V0 | NONE | V0 | tv0 |
| MORE THAN V0 AND NO MORE THAN V1 | P1 | Vp1 | tp1 |
| MORE THAN V1 AND NO MORE THAN V2 | P2 | Vp2 | tp2 |
| MORE THAN V2 AND NO MORE THAN V3 | P3 | Vp3 | tp3 |
| MORE THAN V3 AND NO MORE THAN V4 | P4 | Vp4 | tp4 |

IMAGE READING APPARATUS AND METHOD OF ACCELERATING DRIVE OF READING PORTION THEREOF

BACKGROUND OF THE INVENTION

1. Field of the Invention

The present invention generally relates to an image reading apparatus mounted on a copy machine, a printer, a facsimile machine, a scanner, etc., and a method of accelerating the drive of a reading portion of an image reading apparatus.

2. Description of the Related Art

With a conventional image reading apparatus for reading an image by scanning an optical unit (e.g. lamp, mirror) across an original document or the like, the optical unit accelerates while moving from a stop position (home position) to an image reading position to a predetermined speed, and then begins to read in a constant speed from the image reading position. However, in a case where a motor of the image reading apparatus is rapidly accelerated or decelerated, the optical unit cannot switch smoothly to the constant speed due to inertia caused by the rapid acceleration or deceleration thereof, thereby causing the optical unit to overshoot. Therefore, in a case where the optical unit reaches the image reading position before the overshot is recovered, the optical unit cannot move at a constant speed, thereby creating irregular images such as shaky images, or overlapped images. Particularly, in reading with a full color reading apparatus employing an RGB (Red-Green-Blue) tri-linear CCD (Charge Coupled Device) sensor, the optical unit lurches to cause the RGB tri-linear CCD sensor to deviate slightly from an RGB reading position, thereby resulting to problems such as inadvertently coloring both sides of a black line. An excessive rapid acceleration being uncontrollable for a torque of the motor causes the motor to lose synchronism, and result to stoppage of the image reading apparatus. However, attempting to solve the foregoing problem by reducing rapid acceleration requires a large runway space for acceleration, thereby requiring a large sized apparatus which results to an increase in manufacture cost. Therefore, in order to provide an image reading apparatus of high speed, small size, and low cost for enhancing productivity, the image reading apparatus is required to accelerate to high speed while restraining the shock or overshoot caused when the rate of acceleration is changed.

For example, in a conventional art shown in Japanese laid open publication No. Hei10-23215 for restraining overshoot, a motor is accelerated to a target rate from the exact point where the motor reaches peak speed in response to a rapid increase in the driving rate. Nevertheless, in a case where magnification for image reading is adjusted by changing the scanning speed of the optical unit, acceleration needs to achieve a suitable speed for any given magnification factor within the range of the magnification. Therefore, CPU for control would be burdened with a considerable load since an acceleration curve in achieving a required speed is to be calculated each time and since an acceleration rate is to be controlled for achieving smooth acceleration.

For solving such problem, another conventional art shown in Japanese patent laid open publication No. Hei8-186690 provides a memory apparatus storing therein curves for acceleration and deceleration beforehand, and controlling acceleration and deceleration by reading the curves from the memory apparatus.

Nevertheless, since the conventional art shown in Japanese patent laid open publication No. Hei10-23215 is not mainly aimed to restrain the problem of overshoot, the degree of overshoot and the timing of overshoot for the conventional art largely depend on factors such as the property of the driving components or the assembling method thereof. Accordingly, with the conventional art, the point at which peak speed is observed would be inconstant, and the motor may lose synchronism by failing to switch acceleration rate at the exact timing.

In a case of the conventional art shown in Japanese patent laid open publication No. Hei8-186690, an increase in acceleration rate is required for shortening runway length if a single table for acceleration is used to cover all ranges of reading speed. Such case causes problems such as irregular images and loss of synchronism of the motor. An attempt may be made to solve the foregoing problems by preparing a plurality of tables suitable for all reading speeds. For example, in a case of changing magnification from 25 percent to 400 percent, the fastest reading speed would be 16 times faster than the slowest reading speed. A considerably large memory capacity for storing the tables is thus required for covering such speed range.

It is therefore an object of this invention to provide an image reading apparatus, having high speed, small size and low cost, capable of reducing CPU load and capacity required for storing a table therein.

SUMMARY OF THE INVENTION

It is a general object of the present invention to provide an image reading apparatus that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by an image reading apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides an image forming apparatus, including a reading portion for reading an image by scanning an original document, driving means for driving the reading portion, and memory means for storing therein a plurality of driving frequencies for enabling the driving means to switch to a variety of speeds and drive in a step by step manner, and for storing therein a table indicative of a switching point for switching one driving frequency of the plurality of driving frequencies to another driving frequency of the plurality of driving frequencies, wherein one driving frequency of the plurality of driving frequencies is switched to another driving frequency of the plurality of driving frequencies at the switching point.

The reading portion of the image reading apparatus comprising a lamp, a mirror, and a carriage for supporting the lamp and the mirror, is formed as a single unit. The reading portion having a substantial amount of weight gains speed due to moment of inertia created when the reading portion is driven. The reading portion having gained speed will therefore overshoot when slowed down. The degree of overshoot increases in association with the increase in the difference between acceleration rate and deceleration rate, and also in association with the increase in the moment of inertia. A method of forming a reading portion as light as possible or a method of reducing the driving rate could be introduced for reducing overshoot. Nevertheless, there are limits in lightening the weight of the reading portion, and the reduction of driving rate would lower the performance of the image reading apparatus. In a conventional method, a reading portion before reaching an image reading area is moved to a prescribed point as fast as possible, and is then slowed down to a speed for preventing an overshoot upon reaching the proximity of the image reading area. The conventional method, however, has a drawback of requiring a considerable amount of memory capacity for storing therein various curves to cover all reading speeds corresponding to changes in magnification. In solving the foregoing problem, this invention uses a table indicative of a point for switching one driving frequency of a plurality of driving frequencies to another driving frequency of a plurality of driving frequencies, and determines driving frequency with reference to the table.

With the present invention, a memory means includes a table indicative of a switching point for switching one driving frequency of the plurality of driving frequencies to another driving frequency of the plurality of driving frequencies, in which one driving frequency of the plurality of driving frequencies is switched to another driving frequency of the plurality of driving frequencies at the switching point, thereby providing consistent prevention of an overshoot with minimal memory capacity.

Further, in the image reading apparatus of this invention, the plurality of driving frequencies include a low acceleration driving frequency and a high acceleration driving frequency, wherein the high acceleration driving frequency is switched to the low acceleration driving frequency at the switching point.

The plural driving frequencies are basically formed by combining 2 types of frequencies. That is, the driving means is first driven with the high acceleration driving frequency, then, the high acceleration driving frequency is switched to the low acceleration driving frequency upon reaching the switching point, and then the low acceleration driving frequency is switched to a constant reading speed upon reaching a prescribed reading speed selected (determined) from a control panel or the like. Accordingly, gradual acceleration can be provided consistently with simple control with a controller (e.g. CPU) by switching the high acceleration driving frequency to the low acceleration driving frequency at the switching point.

Further, in the image reading apparatus of this invention, the switching point is determined as a point where the driving means reaches a prescribed driving rate, or as a prescribed elapsed time from an initial drive of the driving means.

The switching point is a point where the driving means reaches a prescribed driving rate after being started and gradually accelerated. Since speed and time are closely related, the switching point may also be determined as a prescribed time elapsed from the start of the driving means. Accordingly, a precise point for switching the driving rate can be determined since the switching point is defined as a point where a driving rate of the driving means reaches a prescribed rate, or as a prescribed elapsed time from the initial drive of the driving means.

Further, in the image reading apparatus of this invention, each driving frequency of the plurality of driving frequencies is predetermined according to a reading speed selected (determined) with a control panel or the like, wherein each driving frequency of the plurality of driving frequencies is predetermined to enable the driving rate of the driving means to accelerate to the reading speed before the reading portion reaches an image reading area after the high acceleration driving frequency is switched to the low acceleration driving frequency at the switching point, wherein each driving frequency of the plurality of driving frequencies is predetermined to prevent the driving means from causing an overshoot.

Each driving frequency of the plurality of driving frequencies is predetermined according to a reading speed of the image reading apparatus. It is to be noted that each of the driving frequencies is required to be predetermined to enable the driving speed of the driving means to be accelerated to the reading speed before the reading portion reaches an image reading area after the driving frequency is switched from the high acceleration driving frequency to the low acceleration driving frequency at the switching point. In addition, each of the driving frequencies is required to be predetermined to prevent the driving means from causing an overshoot. Therefore, only a minimal runway length will be required and overshoot can be restrained to a smallest degree since each of the driving frequencies is predetermined for enabling the driving speed of the driving means to accelerate to the reading speed before the reading portion reaches an image reading area after the driving frequency is switched from the high acceleration driving frequency to the low acceleration driving frequency at the switching point, and for preventing the driving means from causing an overshoot.

Further, in another image reading apparatus of this invention, the image reading apparatus may include a calculating means for calculating a driving speed of the driving means in correspondence to the reading speed, wherein the switching point is determined according to the result of the calculating means.

In the aforementioned case, driving frequency is predetermined according to the reading speed of an image reading apparatus with use of a table. This case however is not to be restricted to such particular image reading apparatus. This case requiring no preparation of tables includes a calculating means for calculating driving rate according to reading speed selected (determined) from a control panel or the like, in which the calculating means calculates driving speed each time for determining the switching point. Since the switching point is determined according to the result of the calculating means, the preparation of a table is not required, thereby providing versatility for various types of image reading apparatuses.

Further, in the image reading apparatus of this invention, the driving means is decelerated in an opposite order with respect to acceleration of the driving means by referring to the switching point stored in the table.

The table used for gradual acceleration has a point for switching driving frequency stored therein. The gradual acceleration is performed in the following order: driving in a high rate, switching driving frequency at a switching point, driving in a low rate, driving at reading speed. In an opposite order with respect to the gradual acceleration, a gradual deceleration is performed in the following order: driving at reading speed, driving at a low rate, switching driving frequency at the switching point, driving in a high speed. Since the table having the switching point included therein can also be used for deceleration by driving the driving means in an opposite order with respect to acceleration, the required number of tables would be minimal, thereby saving memory space for the memory means such as RAM (Random Access Memory) or the like.

Other objects and further features of the present invention will be apparent from the following detailed description when read in conjunction with the accompanying drawings.

BRIEF DESCRIPTION OF THE DRAWINGS

FIG. 6 is a view showing the speed ranges and the switching points of present invention in a tabulated manner.

DESCRIPTION OF THE PREFERRED EMBODIMENTS

In the following, embodiments of the present invention will be described with reference to the accompanying drawings.

Figure 1:
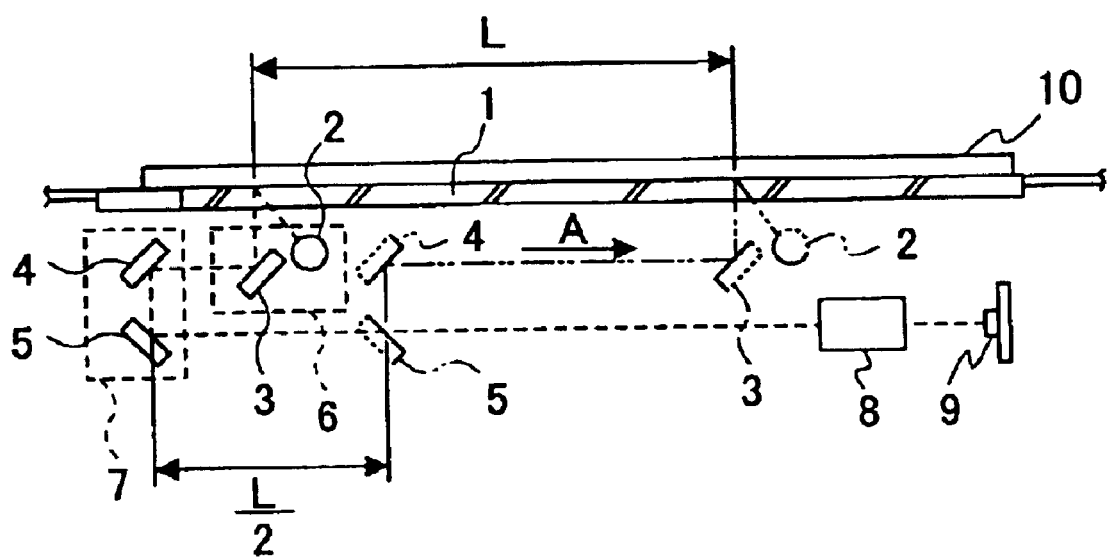
FIG. 1 is a schematic view showing an embodiment of a reading apparatus to which the present invention is applied.

FIG. 1 is a schematic view showing an embodiment of a reading apparatus to which the present invention is applied. The reading apparatus has an original document support portion 1 formed of a transparent glass; a lamp 2 for irradiation upon an original document 10 arranged on the original document support portion 1; a first mirror 3, a second mirror 4, and a third mirror 5 for deflecting a reflected image of the original document 10, respectively; a lens 8 for condensing light reflected from each of the mirrors; and a CCD 9 for photo electric transfer of the condensed light; in which the second mirror 4 and the third mirror 5 move a length of L/2 forward in a direction toward A whenever the lamp 2 and the first mirror 3 move a length of L forward, so that the entire original document 10 can be scanned while maintaining a prescribed light path of a prescribed length.

Figure 2:
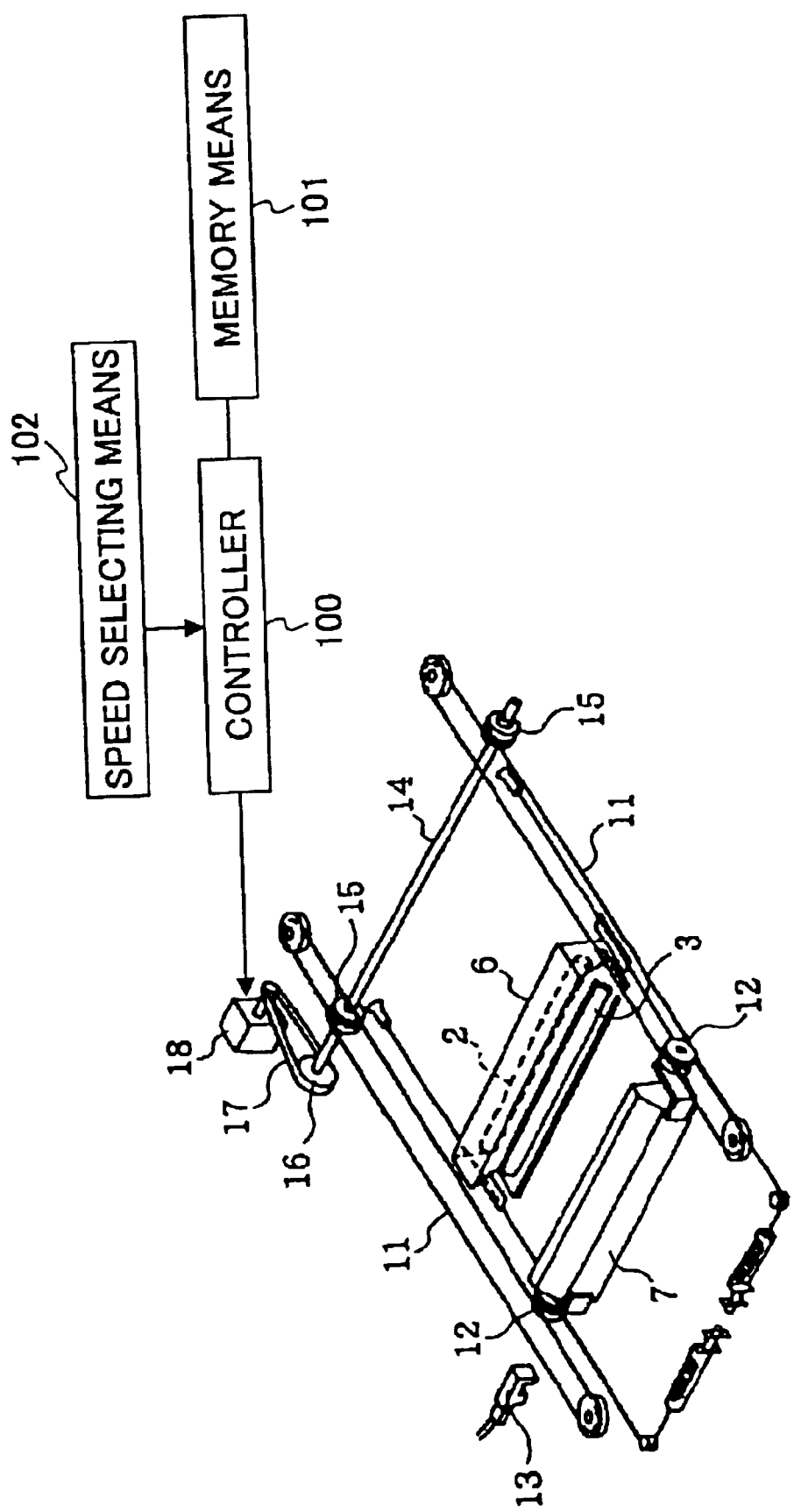
FIG. 2 is a perspective view showing an embodiment of a driving means for explaining a driving system of a reading apparatus to which the present invention is applied.

FIG. 2 is a perspective view showing an embodiment of a driving means for explaining a driving system of a reading apparatus to which the present invention is applied. A first carriage 6 including the lamp 2 and the first mirror 3 is attached to a driving wire 11. A second carriage 7 including the second mirror 4 and the third mirror 5 is connected to a driving wire 11 via a pulley 12 wounded with the driving wire 11. The driving wire 11 is wound to a wire pulley 15 connected to a driving axis 14, thereby allowing the drive of a motor 18 to be transmitted via a timing pulley 16 and a timing belt 17. The first carriage 6 returns a prescribed length back, that is, returns to a home position after one end of the first carriage 6 passes a home position sensor 13. A controller 100, with reference to a memory means 101, controls the drive of the motor 18 in accordance with a reading speed selected (determined) by a speed selecting means 102 (e.g. control panel).

Figure 3:
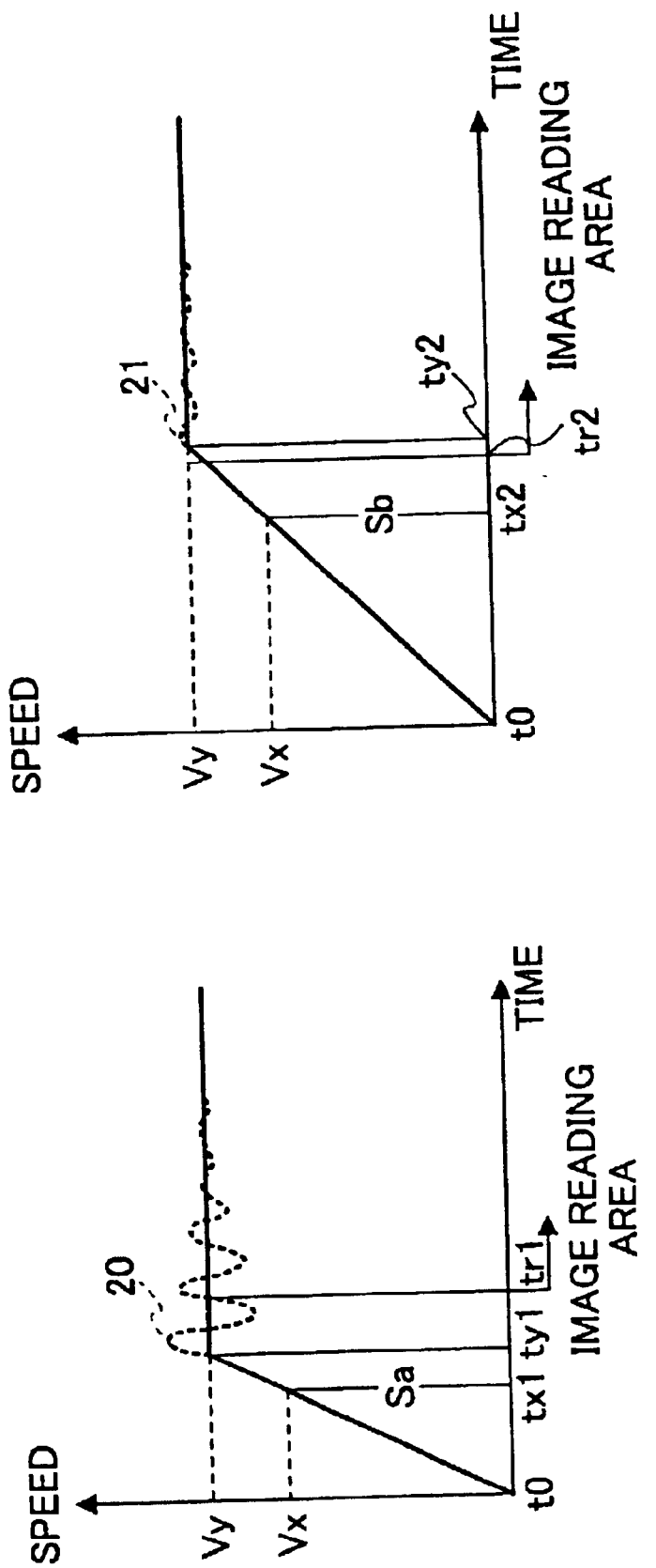
FIG. 3 is a view for describing a driving pattern for each table of the present invention, in which (a) is a view showing a driving pattern for high acceleration, and (b) is a view showing a driving pattern for low acceleration.

FIG. 3 is a view for explaining a driving pattern for each table, in which (a) indicates a driving pattern for a high acceleration table, and (b) indicates a driving pattern for a low acceleration table. With reference to FIG. 3(a), the required runway length is indicated as an area Sa in a case where only a high acceleration table is used in acceleration between time t0 and predetermined reading speed Vy. In such a case, reduction of runway length (time ty1) is possible. Nevertheless, in switching to a constant speed at a point where the predetermined reading speed is Vy, inertia is created to thereby cause an overshoot 20 of the reading portion of the reading apparatus. In this case, the reading portion of the reading apparatus will reach an image reading area (time tr1) before the overshoot 20 is recovered, thereby adversely affecting the reading image.

Meanwhile, with reference to FIG. 3(b), in a case where only a low acceleration table is used for acceleration between time t0 the predetermined reading speed Vy, inertia would be little and an overshoot 21 of the reading portion would be minimal when switching the acceleration rate to a constant speed at a point where the predetermined reading speed is Vy. However, the required runway length (time ty2) indicated as an area Sb is too long. This prevents the reading portion from accelerating to the predetermined speed Vy when reaching an image reading area (time tr2).

Figure 4:
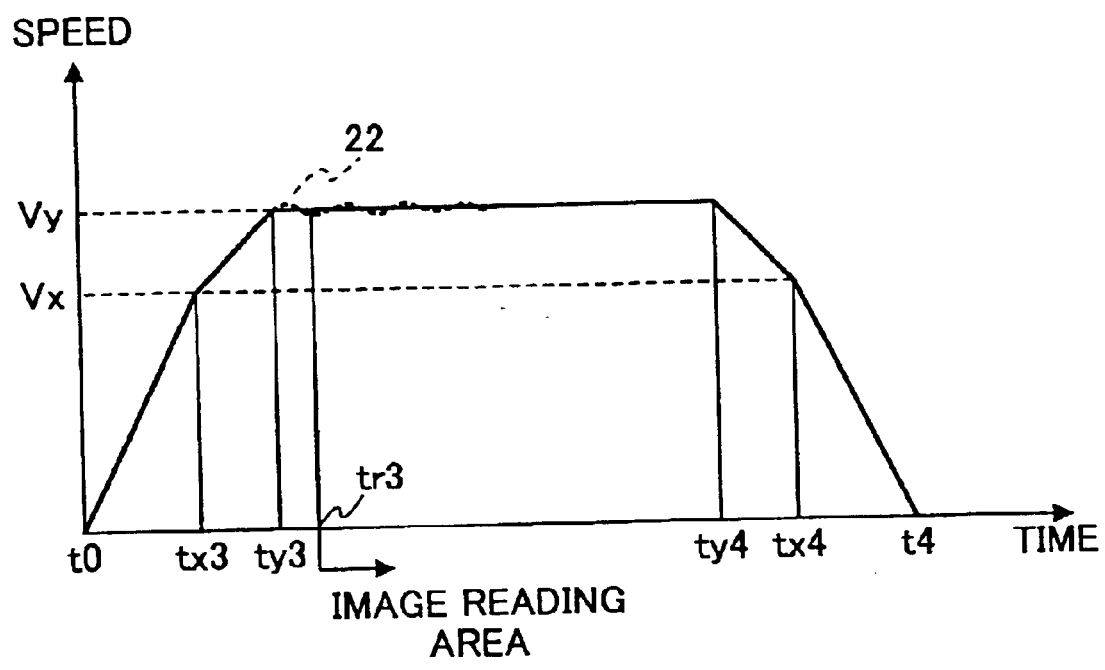
FIG. 4 is a view for explaining a driving pattern of the first embodiment to which the present invention is applied.

FIG. 4 is a view for describing a driving pattern of a first embodiment of this invention. With reference to FIG. 4, the driving means is driven with use of the high acceleration table shown in FIG. 3(a) between start (t0) and speed Vx (tx3), and is then switched to the use of the low acceleration table shown in FIG. 3(b) between speed Vx (tx3) and constant speed Vy. Upon reaching time ty3, the driving means is driven at a reading speed of a constant speed. Accordingly, the driving means can accelerate requiring a short acceleration length (time ty3) and with little overshoot 22 by combining the high acceleration table and the low acceleration table as shown in FIG. 4. In decelerating the driving means subsequent to an image reading process, the low acceleration table is employed for driving the driving means from ty4 to tx4, and then the high acceleration table is employed for driving the driving means from tx4 to t4. Accordingly, deceleration can also be performed with little overshoot and without the loss of synchronism of the motor by using the tables in an opposite order with respect to acceleration. Not only can the aforementioned combination reduce runway length, but can also shorten the time required for the reading portion to reach the image reading area (time tr3).

The reading portion of the image reading apparatus comprising a lamp, a mirror, and a carriage for supporting the lamp and the mirror, is formed as a single unit. The reading portion having a substantial amount of weight gains speed due to moment of inertia created when the reading portion is driven. The reading portion having gained speed will therefore overshoot when slowed down. The degree of overshoot increases in association with the increase in the difference between acceleration rate and deceleration rate, and also in association with the increase in the moment of inertia. A method of forming a reading portion as light as possible or a method of reducing the driving rate could be introduced for reducing overshoot. Nevertheless, there are limits in lightening the weight of the reading portion, and the reduction of driving rate would lower the performance of the image reading apparatus. In a conventional method, a reading portion before reaching an image reading area is moved to a prescribed point as fast as possible, and is then slowed down to a speed for preventing an overshoot upon reaching the proximity of the image reading area. The conventional method, however, has a drawback of requiring a considerable amount of memory capacity for storing therein various curves to cover all reading speeds corresponding to changes in magnification. In solving the foregoing problem, this invention uses a table indicative of a point for switching one driving frequency of a plurality of driving frequencies to another driving frequency of a plurality of driving frequencies, and determines driving frequency with reference to the table.

Figure 5:
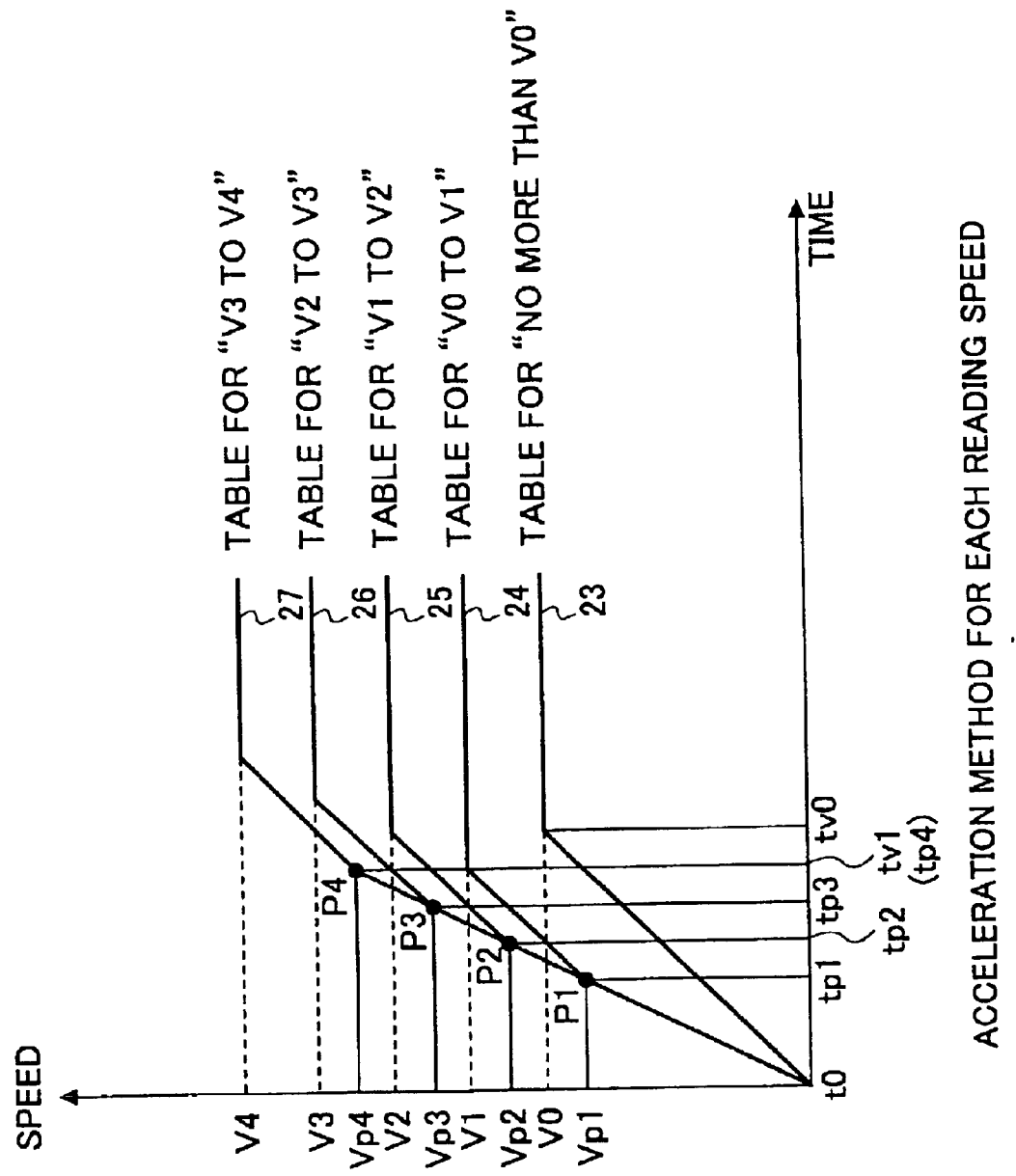
FIG. 5 is a view for explaining a method for accelerating to plural target speeds (reading speeds) of the second embodiment to which the present invention is applied.

FIG. 5 is a view for explaining a second embodiment of this invention regarding a method for accelerating to plural predetermined speeds. FIG. 6 is a tabulated view for indicating speed ranges and switching points. The second embodiment will be explained hereinafter with reference to FIG. 5 and FIG. 6. In a case where a low speed driving is performed with a speed range 28 of "more than 0 and no more than V0", a switching point 29 is "none". Therefore, acceleration is performed only with use of a low acceleration table in a manner shown with a straight line 23 extending from start time t0. That is, a driving means is accelerated at a low driving rate from t0 to V0 (tv0), and is changed to a constant reading speed upon reaching a driving speed of V0. Next, in a case where the speed range 28 has a range of "more than V0 and no more than V1", the switching point 29 is "P1". Therefore, in a manner shown with a straight line 24 extending from start time t0, the driving means is accelerated at a high driving rate until reaching Vp1, and is then switched to a low driving rate in accordance with a low acceleration table at point P1, and is then changed to a constant reading speed upon reaching a driving rate of V1. Next, in a case where the speed range 28 has a range of "more than V1 and no more than V2", the switching point 29 is "P2". Therefore, in a manner shown with a straight line 25 extending from start time t0, the driving means is accelerated at a high driving rate until reaching Vp2, and is then switched to a low driving rate in accordance with a low acceleration table at point P2, and is then changed to a constant reading speed upon reaching a driving rate of V2. Next in a case where the speed range 28 has a range of "more than V2 and no more than V3", the switching point 29 is "P3". Therefore, in a manner shown with a straight line 26 extending from start time t0, the driving means is accelerated at a high driving rate until reaching Vp3, and is then switched to a low driving rate in accordance with a low acceleration table at point P3, and is then changed to a constant reading speed upon reaching a driving rate of V3. Next, in a case where the speed range 28 has a range of "more than V3 and no more than V4", the switching point 29 is "P4". Therefore, in a manner shown with a straight line 27 extending from start time t0, the driving means is accelerated at a high driving rate until reaching Vp4, and is then switched to a low driving rate in accordance with a low acceleration table at point P4, and is then changed to a constant reading speed upon reaching a driving rate of V4.

Accordingly, in a case where a sufficient runway length cannot be provided with use of the low acceleration table alone, acceleration can be beneficially performed by combining the high acceleration table and the low acceleration table. Since switching points between low acceleration and high acceleration vary according to reading speed, the switching points are required to be predetermined in correspondence to each reading speed, and are required to be stored into the memory means 101 such as RAM or the like. In determining each point indicated in the table shown in FIG.6, speed 30 and time 31 are stored, and the speed and the time corresponding to each point are then detected, thereby, allowing the driving speed to be switched. In a case where there is room for further control for the controller 100 (e.g. CPU), the switching points may be determined from calculating the driving speed each time according to reading speed.

As the example of FIG. 5, tables for 5 kinds of reading speeds including "0 to V0", "V0 to V1", "V1 to V2", "V2 to V3", and "V3 to V4" would be required unless the high acceleration table and the low acceleration table are used in combination. In combining the tables, a desired acceleration can be achieved by employing tables of two kinds (a high acceleration table and a low acceleration table) and by storing the table shown in FIG. 6 into the memory means 101 such as RAM or the like. In a case where there is a large gap between the upper limit and lower limit for the high acceleration table and those of the low acceleration table, the tables may be more than two kinds. Various tables corresponding to different acceleration rates may also be provided for singular use and for combined use.

Further, the present invention is not limited to these embodiments, but various variations and modifications may be made without departing from the scope of the present invention.

The present application is based on Japanese priority application No. 2001-358335 filed on Nov. 22, 2001, with the Japanese Patent Office, the entire contents of which are hereby incorporated by reference.

What is claimed is:

1. An image forming apparatus, comprising:
   a reading portion for reading an image by scanning an original document;
   driving means for driving the reading portion; and
   memory means for storing therein a plurality of driving frequencies for enabling the driving means to switch to a variety of speeds and drive in a step by step manner, and for storing therein a table indicative of a switching point for switching one driving frequency of the plurality of driving frequencies to another driving frequency of the plurality of driving frequencies,
   wherein one driving frequency of the plurality of driving frequencies is switched to another driving frequency of the plurality of driving frequencies at the switching point.

2. The image reading apparatus as claimed in claim 1, wherein the plurality of driving frequencies include a low acceleration driving frequency and a high acceleration driving frequency, wherein the high acceleration driving frequency is switched to the low acceleration driving frequency at the switching point.

3. The image reading apparatus as claimed in claim 1, wherein the switching point is determined as a point where a driving speed of the driving means reaches a prescribed point, or as a prescribed elapsed time from an initial drive of the driving means.

4. The image reading apparatus as claimed in claim 1, wherein each driving frequency of the plurality of driving frequencies is predetermined according to a reading speed, wherein each driving frequency of the plurality of driving frequencies is predetermined to enable the driving speed of the driving means to accelerate to the reading speed before the reading portion reaches an image reading area after the high acceleration driving frequency is switched to the low acceleration driving frequency at the switching point, and wherein each driving frequency of the plurality of driving frequencies is predetermined to prevent the driving means from causing an overshoot.

5. The image reading apparatus as claimed in claim 1, wherein the driving means is decelerated with reference to the switching point stored in the table.

6. The image reading apparatus as claimed in claim 1, further comprising speed selecting means for selecting a speed range from a plurality of speed ranges of the driving means, wherein the table stored in the memory means is indicative of a plurality of switching points corresponding to the plurality of speed ranges, wherein each switching point of the plurality of switching points is designated to corresponding one of the plurality of speed ranges selected by the speed selecting means.

7. An image forming apparatus, comprising:

a reading portion for reading an image by scanning an original document;

driving means for driving the reading portion;

memory means for storing therein a plurality of driving frequencies for enabling the driving means to switch to a variety of speeds and drive in a step by step manner; and calculating means for determining a switching point for switching one driving frequency of a plurality of driving frequencies to another driving frequency of the plurality of driving frequencies by calculating a driving speed of the driving means in correspondence to a reading speed, wherein one driving frequency of the plurality of driving frequencies is switched to another driving frequency of the plurality of driving frequencies at the switching point.

8. A method of accelerating the drive of a reading portion of an image reading apparatus, comprising the steps of:

determining a reading speed of the reading portion;

determining a switching point; and switchably driving the reading portion from one driving frequency of a plurality of driving frequencies to another driving frequency of the plurality of driving frequencies, the driving frequency serving to drive a driving means of the reading portion.

9. The method as claimed in claim 8, wherein the switching point is determined by selecting the switching point from a table.

10. The method as claimed in claim 8, wherein the switching point is determined by calculating the switching point from a reading speed.

11. An image forming apparatus, comprising:

means for determining a reading speed of a reading portion;

means for determining a switching point; and means for switchably driving the reading portion from one driving frequency of a plurality of driving frequencies to another driving frequency of the plurality of driving frequencies.

12. An image forming apparatus, comprising:

a reading portion for reading an image by scanning an original document;

a driving unit configured to drive the reading portion; and a memory unit configured to store a plurality of driving frequencies for enabling the driving unit to switch to a variety of speeds and drive in a step by step manner, and for storing therein a table indicative of a switching point for switching one driving frequency of the plurality of driving frequencies to another driving frequency of the plurality of driving frequencies, wherein one driving frequency of the plurality of driving frequencies is switched to another driving frequency of the plurality of driving frequencies at the switching point.

13. The image reading apparatus as claimed in claim 12, further comprising a speed selecting unit configured to select a speed range from a plurality of speed ranges of the driving unit, wherein the table stored in the memory unit is indicative of a plurality of switching points corresponding to the plurality of speed ranges, wherein each switching point of the plurality of switching points is designated to corresponding one of the plurality of speed ranges selected by the speed selecting unit.

14. An image forming apparatus, comprising:

a reading portion for reading an image by scanning an original document;

a driving unit configured to drive the reading portion;

a memory unit configured to store therein a plurality of driving frequencies for enabling the driving unit to switch to a variety of speeds and drive in a step by step manner; and a calculating unit configured to determine a switching point for switching one driving frequency of a plurality of driving frequencies to another driving frequency of the plurality of driving frequencies by calculating a driving speed of the driving unit corresponding to a reading speed, wherein one driving frequency of the plurality of driving frequencies is switched to another driving frequency of the plurality of driving frequencies at the switching point.

* * * * *